US012779598B2

(12) United States Patent
Chen et al.

(10) Patent No.: US 12,779,598 B2
(45) Date of Patent: Nov. 3, 2026

(54) REGULATION LAYER FOR DISSIMILAR METAL FRICTION WELDING INTERFACE AND ALUMINUM-STEEL FRICTION WELDING METHOD

(71) Applicant: Nanchang Hangkong University, Nanchang City (CN)

(72) Inventors: Yuhua Chen, Nanchang City (CN); Min Zheng, Nanchang City (CN); Nan Wang, Nanchang City (CN); Yuxin Xu, Nanchang City (CN); Qing Jiang, Nanchang City (CN); Tao Jiang, Nanchang City (CN); Chao Wan, Nanchang City (CN); Jie Li, Nanchang City (CN)

(73) Assignee: Nanchang Hangkong University, Nanchang City (CN)

( * ) Notice: Subject to any disclaimer, the term of this patent is extended or adjusted under 35 U.S.C. 154(b) by 0 days.

(21) Appl. No.: 19/333,795

(22) Filed: Sep. 19, 2025

(65) Prior Publication Data

US 2026/0200016 A1 Jul. 16, 2026

(30) Foreign Application Priority Data

Jan. 14, 2025 (CN) ........................ 202510058290.3

(51) Int. Cl.
*B23K 20/00* (2006.01)
*B23K 20/12* (2006.01)
(Continued)

(52) U.S. Cl.
CPC ........ *B23K 35/004* (2013.01); *B23K 20/1225* (2013.01); *B23K 20/1275* (2013.01);
(Continued)

(58) Field of Classification Search
CPC .............. B23K 26/355; B23K 26/0006; B23K 2103/04; B23K 26/362; B23K 20/129;
(Continued)

(56) References Cited

U.S. PATENT DOCUMENTS 4,456,812 A * 6/1984 Neiheisel ............ C21D 8/1294 148/903
4,468,551 A * 8/1984 Neiheisel .......... B23K 26/0821 219/121.75
(Continued)

FOREIGN PATENT DOCUMENTS

CN 111958113 A 11/2020
CN 117047275 A 11/2023
CN 119703320 A 3/2025

OTHER PUBLICATIONS

First Office Action for Chinese Patent Application No. 202510058290.3 mail date May 24, 2025, 7 pages.
(Continued)

*Primary Examiner* — Erin B Saad
(74) *Attorney, Agent, or Firm* — Maine Cernota & Curran

(57) ABSTRACT

Disclosed are a regulation layer for a dissimilar metal friction welding interface and an aluminum-steel friction welding method. The regulation layer for a dissimilar metal friction welding interface includes a micro-texture arranged on a metal surface, and a paste spread at the micro-texture, where non-metal substances in the paste are completely volatilized before metallurgical bonding of dissimilar metals. The aluminum-steel friction welding method includes: preparing a micro-structure in a designated area on a surface of a stainless steel plate, mixing a zinc-20 aluminium (Zn-20Al) powder and ethanol under stirring into a paste, then uniformly spreading the paste in a micro-structure area on a surface of a base metal, and then performing a friction stir welding.

4 Claims, 3 Drawing Sheets

(51) Int. Cl.

| | |
|---|---|
| ***B23K 20/24*** | (2006.01) |
| ***B23K 35/00*** | (2006.01) |
| ***B23K 35/02*** | (2006.01) |
| ***B23K 35/28*** | (2006.01) |
| ***C22C 18/04*** | (2006.01) |
| *B23K 103/20* | (2006.01) |

(52) U.S. Cl.

CPC ............ *B23K 20/128* (2013.01); *B23K 20/24* (2013.01); *B23K 35/002* (2013.01); *B23K 35/0255* (2013.01); *B23K 35/282* (2013.01); *C22C 18/04* (2013.01); *B23K 2103/20* (2018.08)

(58) Field of Classification Search

CPC ................ B23K 20/12; B23K 2103/10; B23K 2103/18; B23K 20/123; B23K 20/002; B23K 35/286; B23K 2101/34

See application file for complete search history.

(56) References Cited

U.S. PATENT DOCUMENTS

| | | | | |
|---|---|---|---|---|
| 8,492,005 | B2 * | 7/2013 | Nakagawa | B23K 20/02 228/208 |
| 9,174,298 | B2 * | 11/2015 | Kasukawa | B23K 26/244 |
| 9,272,361 | B2 * | 3/2016 | Nakagawa | B23K 20/16 |
| 10,259,073 | B2 * | 4/2019 | Nanbu | C22C 38/04 |
| 11,292,078 | B2 * | 4/2022 | Huysmans | B23K 20/16 |
| 2003/0006217 | A1 * | 1/2003 | Dance | B23K 15/085 219/121.64 |
| 2004/0256226 | A1 * | 12/2004 | Wickersham, Jr. | H01J 37/3435 204/298.01 |
| 2010/0019084 | A1 * | 1/2010 | Sisk | G06Q 10/087 244/1 R |
| 2010/0279146 | A1 * | 11/2010 | Rowe | B23K 20/1255 228/2.1 |
| 2011/0097595 | A1 * | 4/2011 | Takeda | B23K 9/007 228/101 |
| 2011/0104515 | A1 * | 5/2011 | Kou | B32B 15/017 428/615 |
| 2011/0159313 | A1 * | 6/2011 | Kasukawa | B23K 20/227 228/208 |
| 2011/0220415 | A1 * | 9/2011 | Jin | C23C 14/024 175/320 |
| 2014/0287161 | A1 * | 9/2014 | Ertas | C23C 16/511 204/192.12 |
| 2017/0008121 | A1 * | 1/2017 | Li | B23K 20/129 |
| 2018/0036834 | A1 * | 2/2018 | Menzinger | B23K 20/129 |
| 2018/0056438 | A1 * | 3/2018 | Matsuyama | B23K 20/129 |
| 2018/0264586 | A1 * | 9/2018 | Iqbal | B23K 20/1255 |
| 2019/0210137 | A1 * | 7/2019 | Hasegawa | C21D 9/50 |
| 2020/0023460 | A1 * | 1/2020 | Boswell | B23K 20/023 |
| 2020/0126819 | A1 * | 4/2020 | Ahn | H10P 72/0402 |
| 2020/0290150 | A1 * | 9/2020 | Ahn | C23C 16/45565 |
| 2020/0384578 | A1 * | 12/2020 | Keno | B23K 20/08 |
| 2020/0391322 | A1 * | 12/2020 | Bray | B23K 20/121 |
| 2021/0048053 | A1 * | 2/2021 | Ahn | B23K 20/129 |
| 2021/0095771 | A1 * | 4/2021 | Endrich | B33Y 80/00 |
| 2022/0048141 | A1 * | 2/2022 | Telenko, Jr. | B23K 26/60 |
| 2022/0212281 | A1 * | 7/2022 | Herrich | B23K 28/02 |
| 2022/0384145 | A1 * | 12/2022 | Torbatisarraf | H01J 37/32091 |
| 2022/0402065 | A1 * | 12/2022 | Ramirez | B32B 15/012 |
| 2024/0139859 | A1 * | 5/2024 | Jiang | B23K 20/129 |
| 2024/0269773 | A1 * | 8/2024 | Naito | B23K 26/322 |

OTHER PUBLICATIONS

Notification to Gant Patent Right for Invention for Chinese Patent Application No. 20250058290.3 mail date Aug. 28, 2025, 3 pages.

* cited by examiner

REGULATION LAYER FOR DISSIMILAR METAL FRICTION WELDING INTERFACE AND ALUMINUM-STEEL FRICTION WELDING METHOD

RELATED APPLICATIONS

This patent application claims the benefit and priority of Chinese Patent Application No. 202510058290.3 filed with the China National Intellectual Property Administration on Jan. 14, 2025, the disclosure of which is incorporated by reference herein in its entirety as part of the present application.

TECHNICAL FIELD

The present disclosure belongs to the field of dissimilar metal friction welding technologies, and particularly relates to a regulation and control layer for a dissimilar metal friction welding interface and an aluminum-steel friction welding method.

BACKGROUND

Aluminum and steel dissimilar metal composite structures exhibit the advantages of light weight, high strength and the like, and thus have been widely used in the fields of aerospace, ships, vehicles and the like, offering significant application potential. However, aluminum and steel have significantly different physical and chemical properties and are prone to form brittle, hard intermetallic compounds. A joint obtained by a traditional welding method exhibits poor mechanical properties, and even fails to form a continuous weld seam. Therefore, a reliable connection of aluminum and steel dissimilar materials becomes a hot and difficult point in the field of welding.

The Chinese Patent Application No. 202010979074X discloses an aluminum/steel laser welding method under the action of surface micro-texture composite regulation, which improves the morphological distribution of interface intermetallic compounds through the preparation of a micro-texture, effectively reduces the thickness of the interface intermetallic compound layer and improves the performance of an interface structure. The Chinese Patent Application No. 202311139202X discloses a method for preparing a metal/CFRTP composite structure, which, by preparing a specific micro-texture on the surface of a metal substrate, achieves laser bonding under a certain pressure to obtain a firm joint. However, the performance of the joint obtained by using the welding method described above still needs to be further optimized. More critically, the joints obtained by conventional welding methods exhibit poor toughness, with poor wetting, spreading performance, and element diffusion ability at the joint interface, making it difficult to achieve atomic-level close bonding.

What is needed, therefore, are apparatus and techniques for forming welded joints having improved toughness, wetting, spreading performance, and element diffusion ability at the joint interface, thereby achieving atomic-level close bonding.

SUMMARY

In view of the technical problems mentioned in the background, an object of the present disclosure is to provide a regulation layer for a dissimilar metal friction welding interface and an aluminum-steel friction welding method.

The present disclosure adopts the following technical solutions.

A regulation layer for a dissimilar metal friction welding interface includes a micro-texture arranged on a metal surface, and a paste applied to the micro-texture, where non-metal substances in the paste are completely volatilized before metallurgical bonding of dissimilar metals.

In some embodiments, the dissimilar metals are steel and aluminum, and the paste is a mixture of zinc-20 aluminum (Zn-20Al) powder and ethanol.

In the present disclosure, the Zn-20Al refers to a zinc-aluminum alloy with an aluminum content of 20% by weight.

An aluminum-steel friction welding method based on micro-texture and interlayer composite regulation and control includes the following steps:

- step 1, polishing an aluminum alloy base material and a stainless-steel base material to remove oxide films from surfaces of base materials, and then performing cleaning and drying in sequence;
- step 2, preparing a micro-texture in a designated area on a surface of a stainless-steel plate, and performing ultrasonic cleaning in absolute ethanol for 10 minutes to 15 minutes after completing preparation of the micro-texture;
- step 3, mixing a Zn-20Al powder and ethanol under stirring into a paste, then uniformly spreading the paste in a micro-texture area on the surface of the stainless-steel plate, and then placing base materials to be welded on a welder bench in a lap joint manner with steel on top and aluminum on bottom, followed by locating and clamping using a fixture; and
- step 4, performing friction welding using a friction stir welding machine to obtain an aluminum-steel friction welded joint, a stirring head of the friction stir welding machine being a needleless stirring head.

In some embodiments, a mass ratio of the Zn-20Al powder to the ethanol in step 3 is 1:1.5.

In some embodiments, the paste is spread at a thickness of 10 μm to 50 μm.

In some embodiments, during friction welding, the stirring head is pressed at a rotational speed of 1,500 r/min to 3,000 r/min on an area to be welded, and the stirring head is pressed into an upper surface of the stainless-steel plate to a depth of 0.2 mm, with a pressing speed of 3 mm/min, and a dwell time of 60 s.

In some embodiments, the micro-texture is machined using an ultra-fast laser system, with the following machining parameters: a pulse width of 20 ns, a laser wavelength of 300 nm, a pulse repetition frequency of 20 kHz, a laser power of 10 W, a pulse energy of 0.5 mJ, a laser scanning rate of 20 mm/s to 80 mm/s, and a laser beam scanning area of 20 mm×20 mm; and a groove of the micro-texture obtained by machining has a width of 50 μm and a depth of 200 μm.

In some embodiments, a length direction of the groove of the micro-texture is the same as a width direction of the base materials to be welded.

In some embodiments, during the friction welding, the stirring head is pressed into the area to be welded is performed in the following stages: the stirring head is controlled to be pressed against a top surface of the stainless-steel base material at a rotational speed of 1,500 r/min to 1,800 r/min for 10 seconds to 15 seconds, during which a temperature of the stainless-steel base material is higher than 80° C. but does not exceed 300° C., and the stirring head is then controlled to run at a rotational speed of 2,000 r/min to 3,000 r/min and to be gradually pressed down.

In some embodiments, the stainless-steel base material is a 304 stainless-steel plate, and the aluminum alloy base material is T6 temper 6061 aluminum alloy.

Some embodiments of the present disclosure have the following beneficial effects: A welded joint obtained by adopting the technical solution according to the present disclosure exhibits good toughness (plasticity) and high strength, atomic-level close bonding at an interface of the joint is achieved. The welded joint exhibits excellent mechanical properties and is free of porosity and crack defects. In the welding process, Zn-20Al powder, as a low-melting-point material, forms a soft ductile dispersion including FeZn10 and an Al-rich amorphous phase in a hard and brittle intermetallic compound layer of the joint. The formed dispersion improves the toughness of the joint during welding of the aluminum/steel dissimilar materials, and weakens adverse effects of brittle intermetallic compounds on the mechanical properties. Moreover, in the welding process, an aluminum plate is subjected to plastic deformation under the combined action of frictional heat generation and pressure, and forms a mechanical embedding fit with the micro-texture on the steel surface, which significantly enhances the wetting and spreading performance and the element diffusion ability at the interface. The obtained welded joint not only exhibits a good mechanical embedding characteristic, but also is regulated by an intermediate layer, which, compared with a traditional welding method, improves the plasticity of the intermetallic compounds at the joint interface and enhances the mechanical properties of the aluminum-steel friction welded joint.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

In the figures: 1 refers to a 304 stainless-steel plate, 2 refers to a 6061 aluminum plate, 3 refers to a Zn-20Al intermediate layer (interface layer), 4 refers to a stirring head, and 5 refers to a groove of a micro-texture.

DETAILED DESCRIPTION

Disclosed herein are a regulation layer for a dissimilar metal friction welding interface and an aluminum-steel friction welding method that provide welded joints having improved toughness, wetting, spreading performance, and element diffusion ability at the joint interface, thereby achieving atomic-level close bonding.

The technical solutions in the present disclosure will be described clearly and completely below with reference to the accompanying drawings. Apparently, the described embodiments are only some of, rather than all of, the embodiments of the present disclosure. On the basis of the embodiments of the present disclosure, all other embodiments that could be obtained by those of ordinary skill in the art without creative efforts shall fall within the scope of the present disclosure.

Example 1

Figure 1:
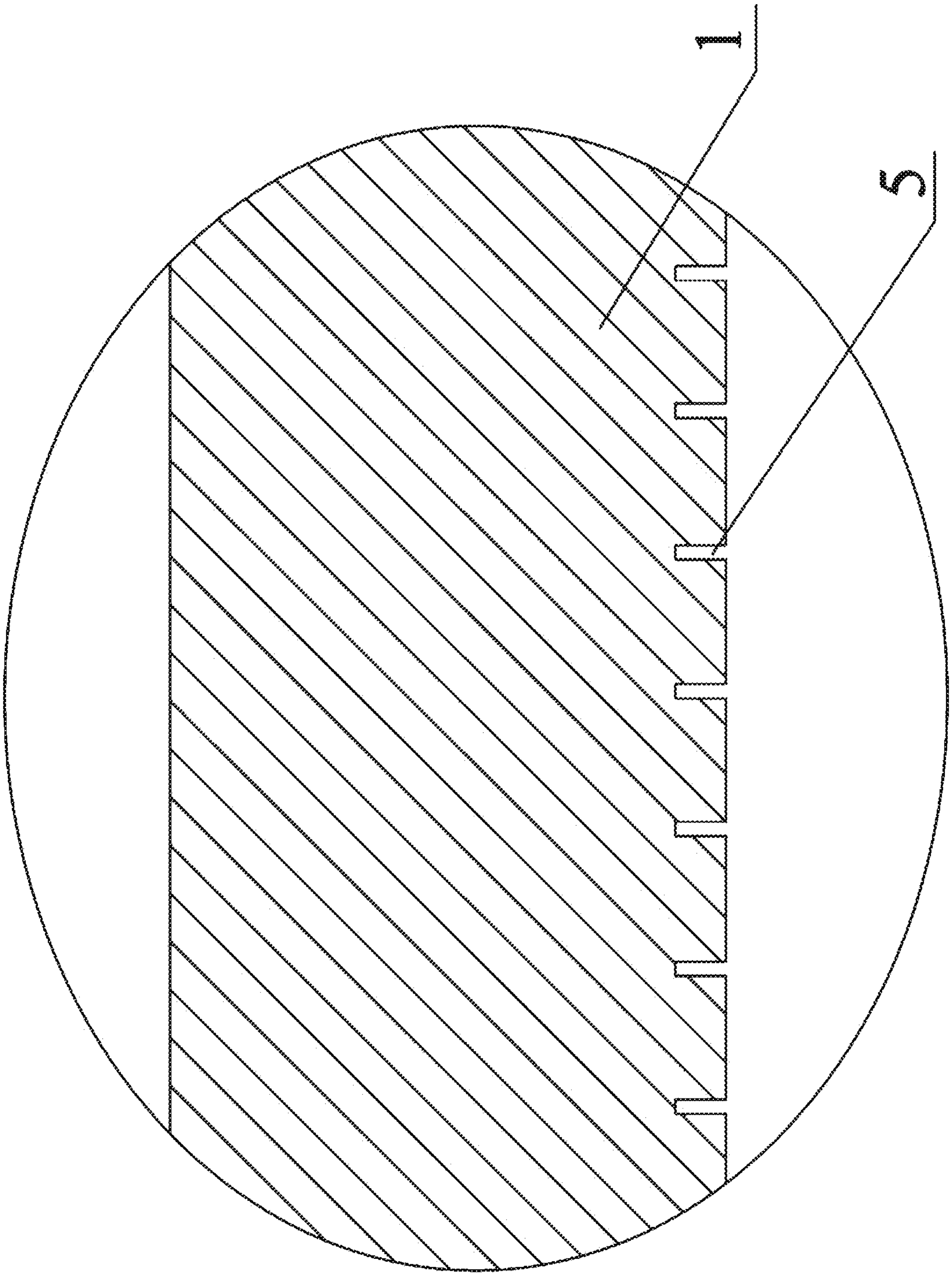
FIG. 1 shows a schematic structural diagram of a micro-texture obtained by machining in Example 1.
Figure 2:
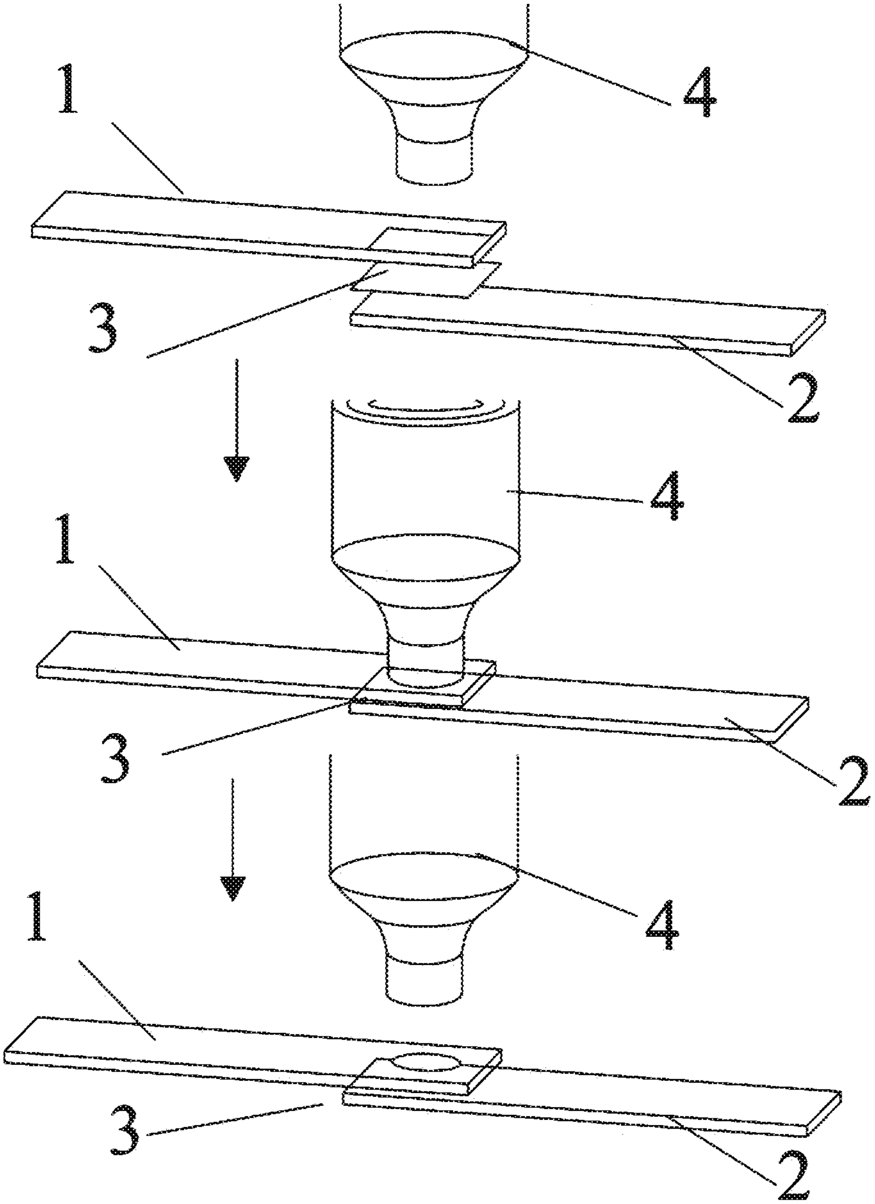
FIG. 2 shows a schematic flow chart of aluminum-steel friction welding in Example 1.
Figure 3:
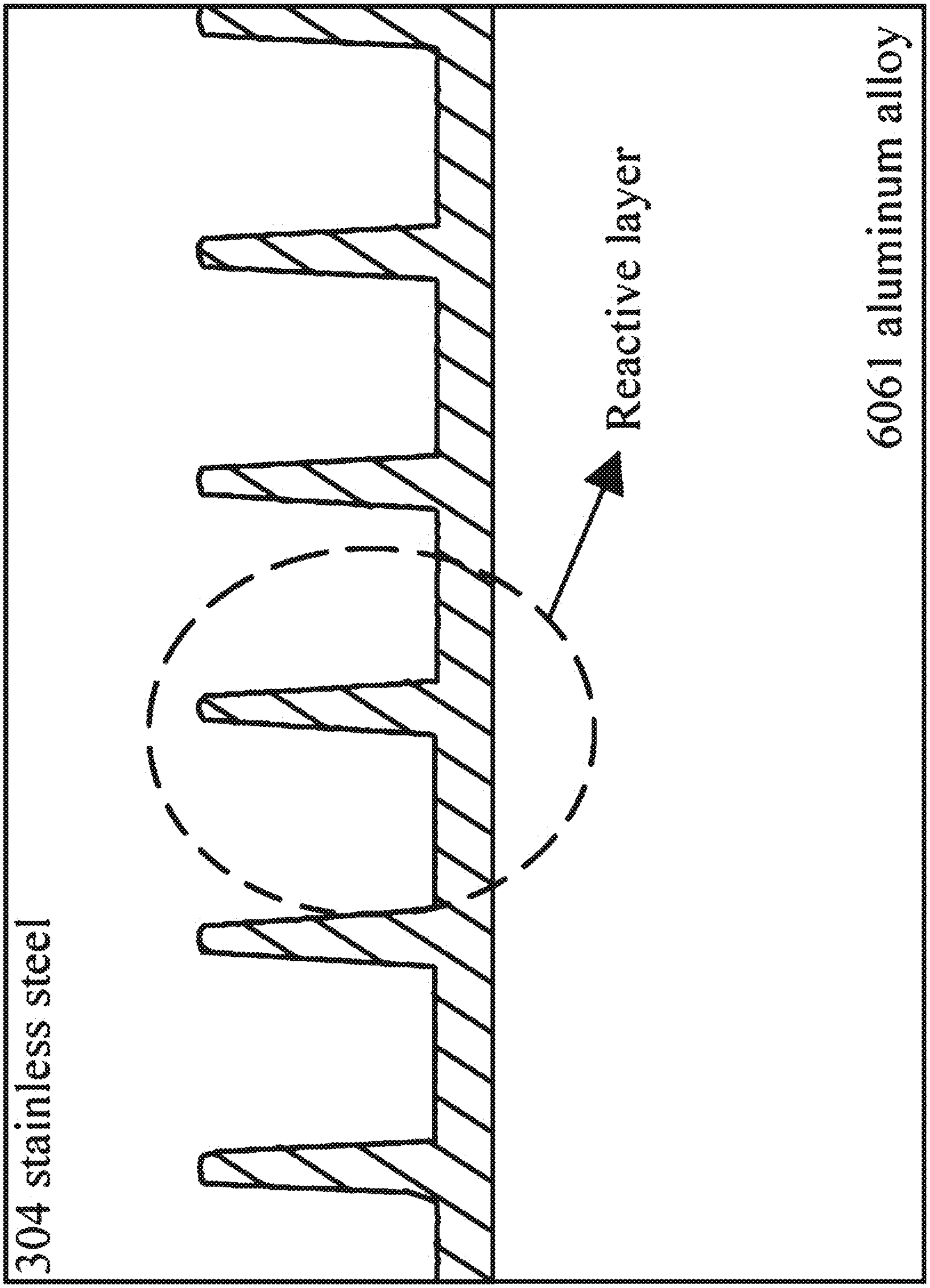
FIG. 3 shows a schematic diagram of an interface of a welded joint obtained in Example 1.

An aluminum-steel friction welding method based on micro-texture and interlayer composite regulation was used for connecting a T6 temper 6061 aluminum alloy plate (referred to as a 6061 aluminum plate) with a 304 stainless-steel plate by means of welding. With reference to FIGS. 1 to 3, the method was conducted by the following steps.

In step 1, an aluminum alloy base material and a stainless-steel base material were polished to remove oxide films from a surface of the aluminum alloy base material and a surface of the stainless-steel base material, and then cleaned and dried in sequence. Specifically, the aluminum alloy base material (6061 aluminum plate) and the 304 stainless-steel base material (304 stainless-steel plate) were polished using 400-grade and 800-grade SiC metallographic sandpaper. And the 6061 aluminum plate and the 304 stainless-steel plate were polished and cleaned using anhydrous ethanol reagent to remove oil stains and oxide films from a surface of the 6061 aluminum plate and a surface of the 304 stainless-steel plate.

In step 2, a micro-texture was prepared in a designated area on the surface of the stainless-steel plate. After the preparation of the micro-texture was completed, the stainless-steel plate having the micro-texture was subjected to ultrasonic cleaning in absolute ethanol for 10 minutes to 15 minutes. Specifically, a cleaned 304 stainless-steel plate was placed on a sample stage of an ultra-fast laser processing system, a striped texture form was selected. And a laser surface micro-texture of which a groove has a width of 50 μm and a depth of 200 μm was prepared in the designated area on the surface of the 304 stainless-steel plate (as shown in FIG. 1) using a nanosecond laser. A length direction of the groove of the micro-texture is the same as a width direction of the 304 stainless-steel plate, and a length of the groove of the micro-texture equals to a width of the 304 stainless-steel plate. A spacing between the micro-textures is 500 μm. After the preparation of the micro-texture was completed, the 304 stainless-steel plate was subjected to ultrasonic cleaning in absolute ethanol for 15 minutes.

In step 3, zinc-20 aluminum (Zn-20Al) powder and ethanol (a mass ratio of Zn-20Al powder to ethanol is 1:1.5) were mixed under stirring into a paste, and then the paste was uniformly spread in the micro-texture area on the surface of the base material (the 304 stainless-steel plate). A top surface of the paste is about 30 μm higher than the surface of the 304 stainless-steel. And then the 304 stainless-steel was placed on the 6061 aluminum plate on a welder bench in a lap joint manner with steel on top and aluminum on bottom and a lap joint length of 20 mm, and then located and clamped using a fixture.

In step 4, friction welding was performed using a friction stir welding machine to obtain an aluminum-steel friction welding joint. with a stirring head of the friction stir welding machine being a needleless stirring head. Specifically, the needleless stirring head made of W-25Re was installed on a spindle of the friction stir welding machine, the welding machine was started, and the stirring head was moved over a welding spot.

Next, the stirring head was controlled to press against a top surface of the stainless-steel base material at a rotational speed of 1,600 r/min for 12 seconds, during which a temperature of the stainless-steel base material is higher than 80° C. but does not exceed 300° C. Remaining ethanol in the paste was quickly evaporated in the length direction of the groove (due to the use of a specific ratio of the Zn-20Al powder to the ethanol and a specific friction stir process, the particle morphology of the Zn-20Al powder in the paste may not be changed after evaporation of ethanol in the paste and before metallurgical bonding). And then the stirring head was controlled to run at a rotational speed of 2,500 r/min and to gradually press down (in this process the particle morphology of the Zn-20Al powder changes under high temperature). And the stirring head was pressed into an upper surface of the stainless-steel to a depth of 0.2 mm, with a pressing speed of 3 mm/min, and a press-holding time of be 60 s after pressing in place to obtain an aluminum-steel friction welded joint, as shown in FIG. 3.

In this example, the results of RT testing on the aluminum-steel friction welded joint shows that the welded joint is free of defects such as pores, cracks, and the like. And the results of mechanical property testing on the aluminum-steel friction welded joint shows that the average shear strength is 3,250 N, which is a significant improvement over a welding structure not added with an intermediate layer or a micro-texture.

In this example, by spreading the paste with a specific ratio at the micro-texture, together with a specific friction welding process, a stable and reliable connection of dissimilar metal materials is realized, which achieves effective welding of the joint and avoids generating the defect of pores while ensuring a uniform chemical diffusion phase and excellent wettability at the interface. In comparative solutions, a large number of pores might be generated at the joint when absolute ethanol is replaced with phosphate salt (a polymeric polymer). A small number of pores might also be generated at the joint in case of too much usage of absolute ethanol, and the welded joint exhibits poor ductility and toughness in case of too little usage of absolute ethanol.

In the welding process, Zn-20Al powder, as a low-melting-point material, formed a soft ductile dispersion (i.e., a ZnAl20 intermediate layer, as shown in FIG. 3) including FeZn10 and an Al-rich amorphous phase in a hard and brittle intermetallic compound layer of the joint. The formed dispersion improves the toughness of the joint during welding of the aluminum/steel dissimilar material, and weakens adverse effects of brittle intermetallic compounds on the mechanical properties. Moreover, in the welding process, an aluminum plate is subjected to plastic deformation under a combined action of frictional heat generation and pressure, and forms a mechanical embedding fit with the micro-texture of a steel surface, which significantly enhances the wetting and spreading performance and the element diffusion ability at the interface. Atomic-level close bonding (metallurgical bonding) is realized at the interface of the joint. The obtained welded joint not only has a good mechanical embedding characteristic, but also is subjected to regulation and control of an intermediate layer compared with a traditional welding method, which improves the plasticity of the intermetallic compounds at the interface of the joint and enhances the mechanical properties of the aluminum steel friction welded joint.

The foregoing description of the embodiments of the invention has been presented for the purposes of illustration and description. Each and every page of this submission, and all contents thereon, however characterized, identified, or numbered, is considered a substantive part of this disclosure for all purposes, irrespective of form or placement within the disclosure. This specification is not intended to be exhaustive or to limit the invention to the precise form disclosed. Many modifications and variations are possible in light of this disclosure.

Although the present disclosure is shown in a limited number of forms, the scope of the disclosure is not limited to just these forms, but is amenable to various changes and modifications. The present disclosure does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An aluminum-steel friction welding method based on micro-texture and interlayer composite regulation, comprising:

step 1, polishing an aluminum alloy base material and a stainless steel base material to remove oxide films from surfaces of the aluminum oxide base material and the stainless steel base material, and then performing cleaning and drying of the aluminum alloy base material and the stainless steel base material in sequence;

step 2, machining a micro-texture in a designated area on a surface of the stainless steel base material, and performing ultrasonic cleaning in absolute ethanol for 10 minutes to 15 minutes after completing the machining of the micro-texture;

step 3, mixing a Zn-20Al powder and ethanol under stirring into a paste, then spreading the paste in a micro-texture area on the surface of the stainless steel base material, and then placing the aluminum alloy base material to be welded and the stainless steel base materials to be welded on a welder bench in a lap joint manner with the stainless steel base material on top of the aluminum alloy base material, followed by locating and clamping together the aluminum alloy base material and the stainless steel base material using a fixture, wherein the paste is a mixture of the Zn-20Al powder and the ethanol, and a mass ratio of the Zn-20Al powder to the ethanol is 1:1.5; and step 4, performing friction welding using a friction stir welding machine to obtain an aluminum-steel friction welded joint, a stirring head of the friction stir welding machine being a needleless stirring head; wherein the aluminum alloy base material is 6061 aluminum alloy, and the stainless steel base material is 304 stainless steel;

the micro-texture is machined using an ultra-fast laser system with the following machining parameters: a pulse width of 20 ns, a laser wavelength of 300 nm, a pulse repetition frequency of 20 kHz, a laser power of 10 W, a pulse energy of 0.5 mJ, a laser scanning rate of 20 mm/s to 80 mm/s, and a laser beam scanning area of 20 mm×20 mm; and the micro-texture obtained by machining features a groove with a width of 50 μm and a depth of 200 μm.

2. The aluminum-steel friction welding method of claim 1, wherein the paste is spread at a thickness of 10 μm to 50 μm.

3. The aluminum-steel friction welding method of claim 1, wherein during the friction welding, the stirring head is pressed at a rotational speed of 1,500 revolutions per minute (r/min) to 3,000 r/min on an area to be welded, and the stirring head is pressed into an upper surface of the stainless steel base material to a depth of 0.2 mm, with a pressing speed of 3 mm/min and a dwell time of 60 s.

4. The aluminum-steel friction welding method of claim 3, wherein during the friction welding, the stirring head is pressed into the area to be welded in the following stages: the stirring head is controlled to be pressed against the upper surface of the stainless steel base material at a rotational speed of 1,500 r/min to 1,800 r/min for 10 s to 15 s, during which a temperature of the stainless steel base material is higher than 80° C. but does not exceed 300° C.; and then the stirring head is controlled to run at a rotational speed of 2,000 r/min to 3,000 r/min and to be pressed down.

* * * * *